United States Patent [19]

Nomura et al.

[11] Patent Number: 4,926,214
[45] Date of Patent: May 15, 1990

[54] ORIGINAL-HOLDING COVER

[75] Inventors: Mitsuo Nomura, Shijounawate; Yukihiro Aikawa, Osaka, both of Japan

[73] Assignee: Mita Industrial Co., Ltd., Osaka, Japan

[21] Appl. No.: 270,776

[22] Filed: Nov. 14, 1988

[30] Foreign Application Priority Data

Nov. 16, 1987 [JP] Japan ................. 62-175460

[51] Int. Cl.$^5$ .............................. G03B 27/62
[52] U.S. Cl. ........................... 355/75; 355/25
[58] Field of Search ................. 355/75, 25

[56] References Cited

U.S. PATENT DOCUMENTS

| | | | |
|---|---|---|---|
| 4,157,222 | 6/1979 | Ishihara | 355/75 |
| 4,204,735 | 5/1980 | Opravil | 355/75 |
| 4,466,736 | 8/1984 | Masaki | 355/75 |
| 4,636,065 | 1/1987 | Kanemitsu et al. | 355/75 |

FOREIGN PATENT DOCUMENTS 96559 6/1983 Japan .
112248 7/1984 Japan .
119447 8/1984 Japan .

Primary Examiner—Monroe H. Hayes
Attorney, Agent, or Firm—Beveridge, DeGrandi & Weilacher

[57] ABSTRACT

An original-holding cover for use in association with an image formation device comprising an upper unit and a lower unit, the upper unit being rotatably mounted on the lower unit so as to be opened and closed, which comprises a base part rotatably connected to an original platen of the upper unit and an original-holding part which is rotatably connected to the base part. When a thick original is duplicated, the entire surface of the original can be uniformly pressed irrespective of the thickness of the original with the original holding part held in a horizontal position by rotating both the base part and the original-holding part. Furthermore, the base part is removable from the original platen and there is provided a stopper means for preventing disconnection of the base part from the original platen due to the impact of opening the upper unit when dealing with a jam or other trouble.

6 Claims, 6 Drawing Sheets

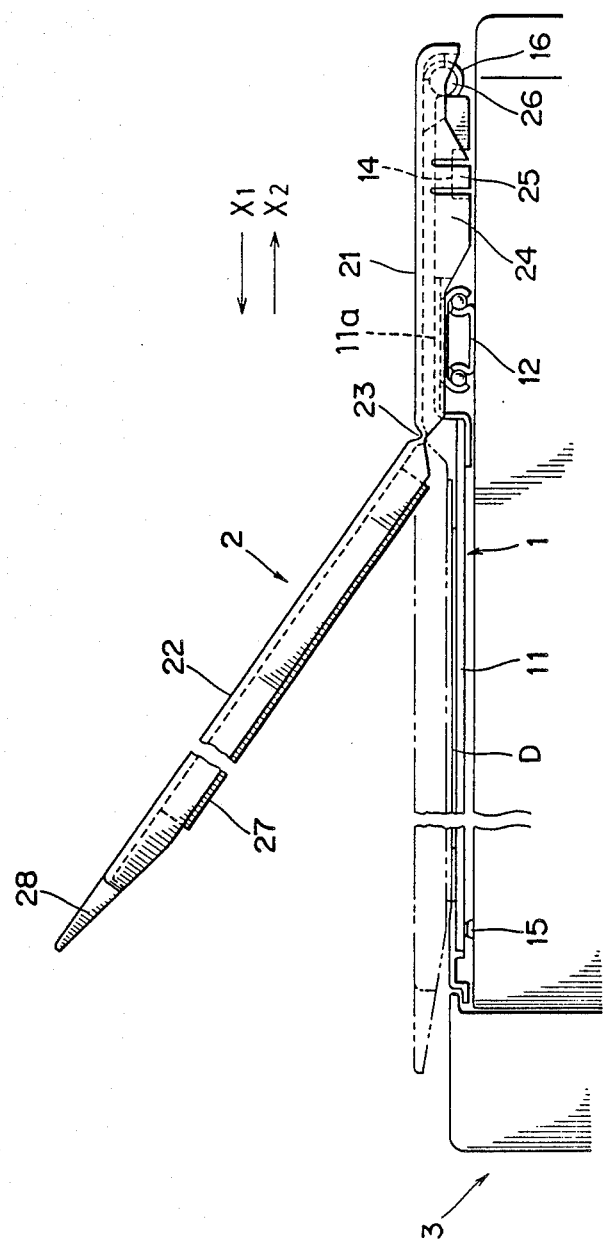

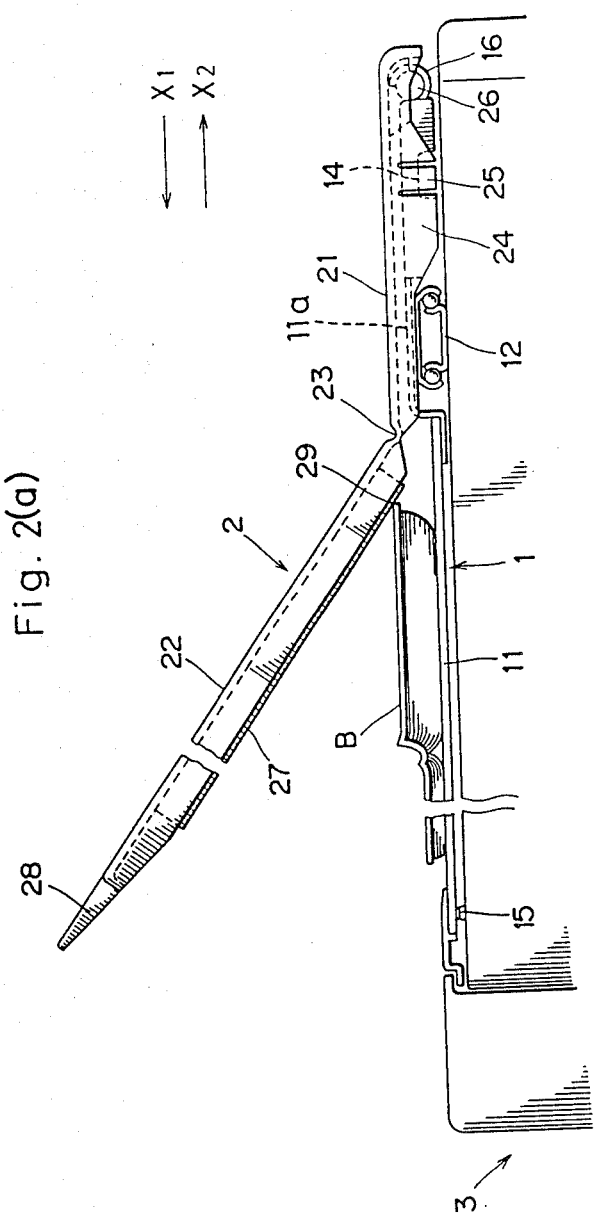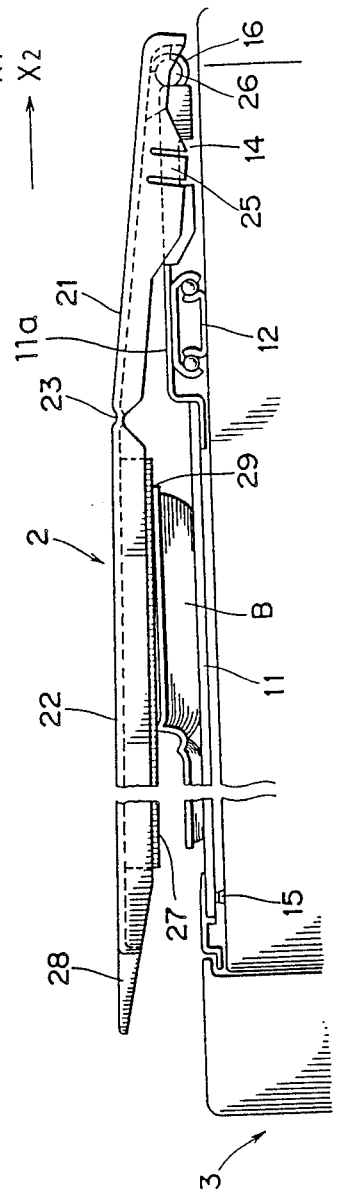

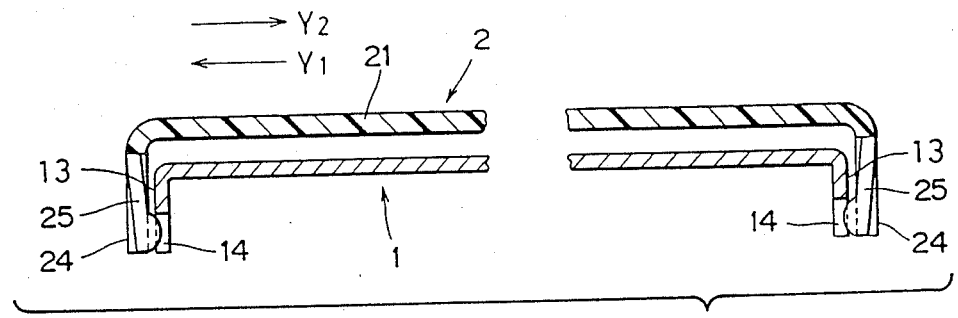
Fig. 3(a)
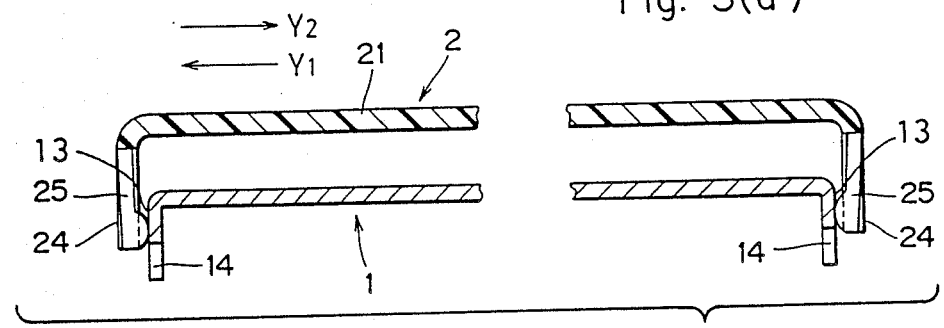
Fig. 3(b)
Fig. 4
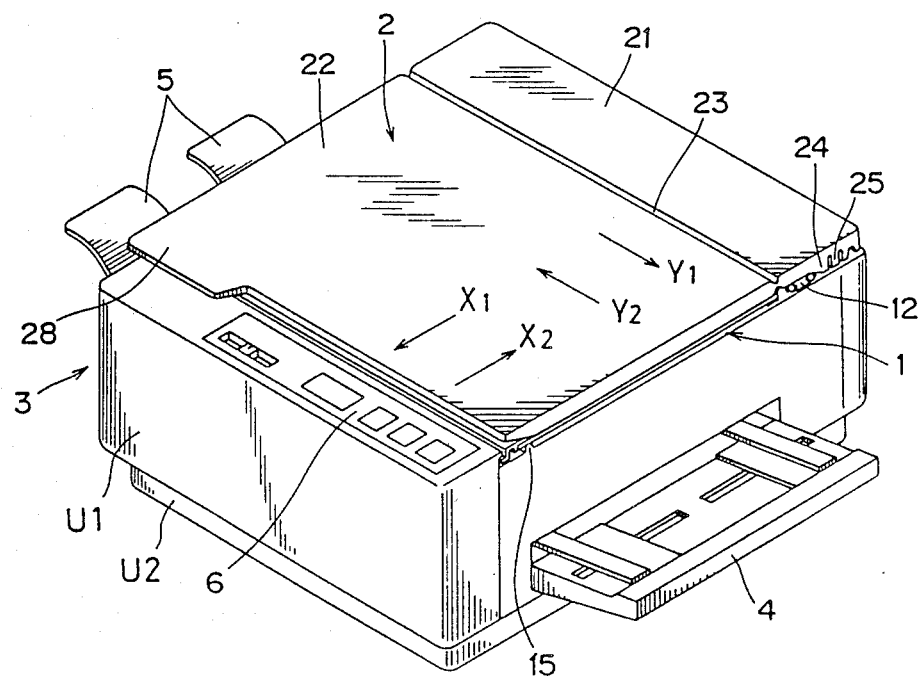

4,926,214

ORIGINAL-HOLDING COVER

BACKGROUND OF THE INVENTION

The present invention relates to an original-holding cover for use in association with an image formation device such as a copying machine, an original reader and so on.

In image formation devices generally, it is common to maintain an original in intimate contact with an original platen by means of a device such that an original-holding cover is rotatably linked to the original platen Where such an original-holding cover comprises a single flat plate, the cover is capable of assuring a close contact of the original all over its surface with the platen when the original is sufficiently thin. However, when the original is thick, e.g. in the case of a book, such an original-holding cover exerts its pressing force only partially, failing to assure an intimate contact of the entire surface of the original with the platen To solve this problem, there has been provided an original-holding cover comprising a base part and an original-holding part which are rotatably interconnected. Furthermore, in order to prevent the base part from rotating in association with the movement of the original-holding part when only the original-holding part is used by opening and closing, original-holding covers each having either of the following arrangements (1) or (2), have been provided (1) Either of the base part or the platen is provided with a magnet and the other with a magnetic element, at predetermined positions (Publication for unexamined Japanese Utility Model Application No. 112248/1984).

(2) The platen is provided with an engaging means that engages with the original-holding part at a predetermined position thereby to control the angle of rotation when the original-holding part only is opened (Publication for unexamnied Japanese Utility Model Applications No. 96559/1983 and No. 119447/1984).

Regarding the above original-holding cover of construction (1), since the attraction between the magnet and magnetic element controls the rotation of the base part, the rotation of the base part can be positively prevented when the original-holding part only is opened. Moreover, when a thick original is copied with use of this original-holding cover, the base part is rotated through a necessary angle with the abutment between the original-holding part and the original serving as a fulcrum, thereby to apply a pressing force to the entire surface of the original.

However, since this construction requires the installation of a magnet and a magnetic element, the structure becomes complicated and demands additional parts. Furthermore, setting of the attractive force between the magnet and magnetic element is difficult and the decrease in magnetic force due to aging results in a failure to control the rotation of the base part.

Regarding the aforesaid original-holding cover of construction (2), since the angle of rotation of the original-holding part itself is restricted by an engaging means provided on the platen, the rotation of the base part can be completely prevented.

Furthermore, with this original-holding cover, a thick original can be subjected to a pressing force over the entire surface by rotating the base par through a necessary angle with the abutment between the original-holding part and the original serving as a fulcrum.

However, in this latter construction, the platen and the original-holding part must be provided with mating elements at predetermined positions and this entails a complicated construction and demands additional parts. Furthermore, high accuracy is required in the positional relationship between the mating elements as well as in their size, and this deteriorates workability in mounting the original-holding cover on the platen.

SUMMARY OF THE INVENTION

It is an object of the present invention to provide an original-holding cover to be used in association with an image formation device whose body is divided into an upper unit and a lower unit, the upper unit being rotatable about a pivotal shaft for opening and closing thereof, which is capable of exerting a pressing force on the entire surface of an original to be duplicated irrespective of the thickness of the original and positively preventing the unwanted rotation of the base part thereof, and is simple in construction.

The above object is accomplished by the present invention. The present invention relates to an original-holding cover comprising:

a base part rotatably connected to an original-platen disposed in the upper unit of the image formation device, an original-holding part connected to the base part in rotatable relation with the latter, opposing ends of the base part having elastic engaging members each of which is adapted to engage with the platen at a predetermined position and resiliently deformable in the direction of release of the engagement, the base part being connected to the platen removably in the direction along the axis of its rotation with respect to the platen and obliquely upward when the upper unit is open, and either or both of the base part and platen being provided with stopper means for preventing obliquely downward movement of the original-holding cover when the upper unit is opened In the above construction, said elastic engaging means are preferably elastic tongue-shaped members and the platen is preferably provided with notches adapted to fit with said elastic engaging means In the above arrangement, since the elastic engaging members are usually in elastic engagement with the appropriate positions of the platen to arrest rotation of the base part, the rotation of the base part on opening of the original-holding part only is prevented. When a thin original is pressed, the original can be brought into intimate contact with the platen by applying a pressing force to the entire surface of the original with the original-holding part.

When a thick original is pressed, by setting the original in the condition of the original-holding part only being open and closing the original-holding part, an upward force is applied to the elastic engaging means with the point of abutment between the original-holding part and original serving as the fulcrum. As a result, the base part is brought into a slightly upwardly rotated position so that the entire surface of the original can be pressed by the original-holding part.

Furthermore, as mentioned above, the base part is attached to the platen disconnectably in the direction along the axis of its rotation with respect to the platen and obliquely upward when the upper unit is open, and either or both of the base part and the platen are provided with stopper means for preventing downward movement of the original-holding cover upon opening of the upper unit. Therefore, notwithstanding the fact that the base part is removable from the platen, the stoppers assure a positive prevention of the base part against being disengaged from the platen by the impact of opening the upper unit when dealing with a jam, for instance Even when the elastic engageable member is an elastic tongue piece or even when the platen is provided with a notch adapted to engage with said tongue piece, the same operation as above can be successfully accomplished.

BRIEF DESCRIPTION OF THE DRAWINGS

FIG. 1 is a side elevation view illustrating the original-pressing action of the original-holding cover of the invention when a thin original is copied;

FIG. 2(a) and (b) are side elevation views illustrating the original-pressing action when a thick original is copied;

FIG. 3(a) and (b) are longitudinal section views illustrating, the action of an elastic tongue member;

FIG. 4 is a perspective view of a copying machine with its original-holding cover closed;

DETAILED DESCRIPTION OF PREFERRED EMBODIMENTS

Figure 5:
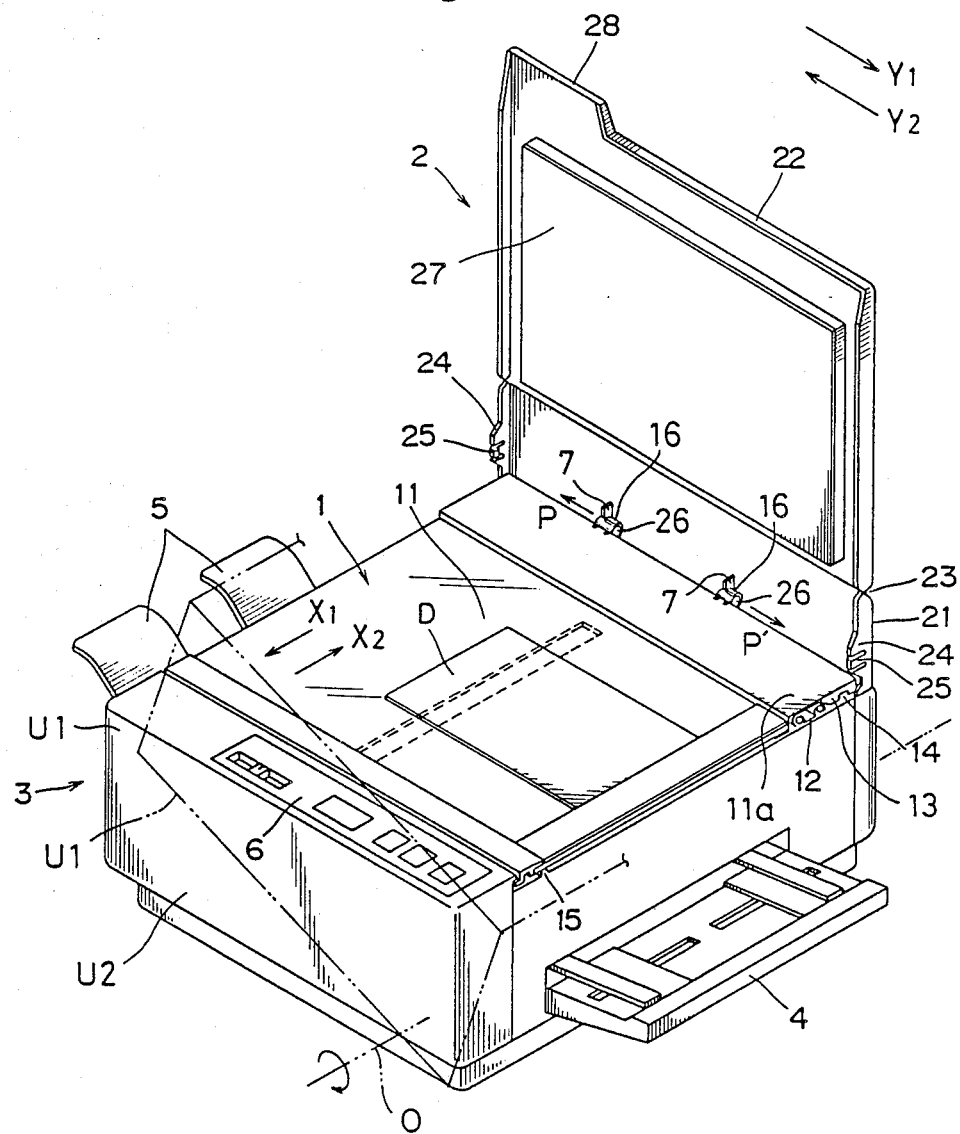
FIG. 5 is a perspective view illustrating a copying machine with its original-holding cover open and its upper unit in open position.
Figure 6:
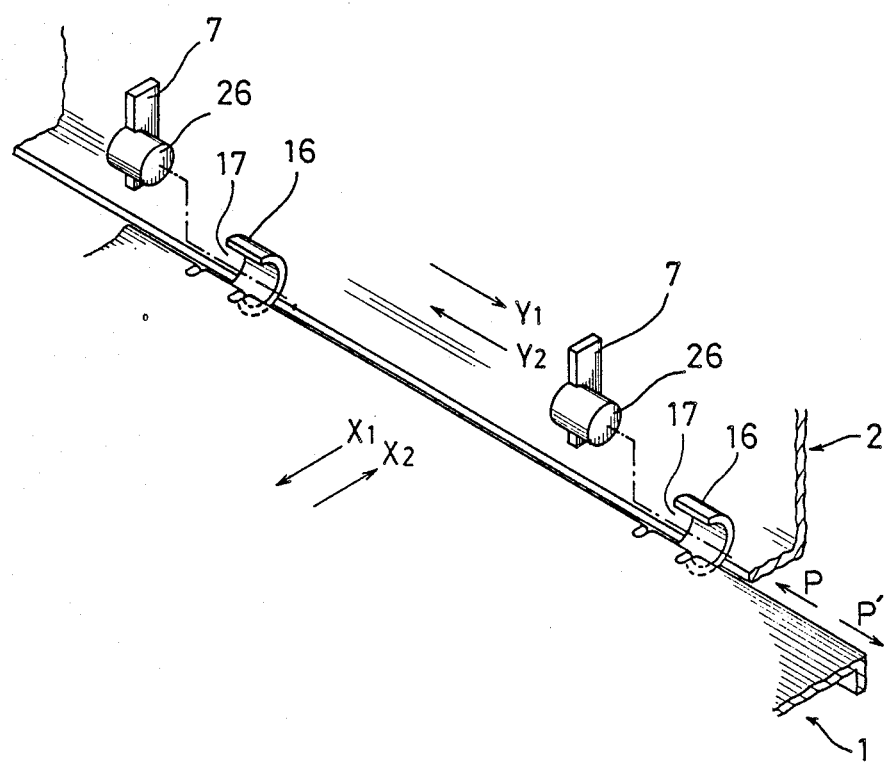
FIG. 6 is a perspective disassembled view showing the connection of the original-holding cover to the platen.
Figure 7:
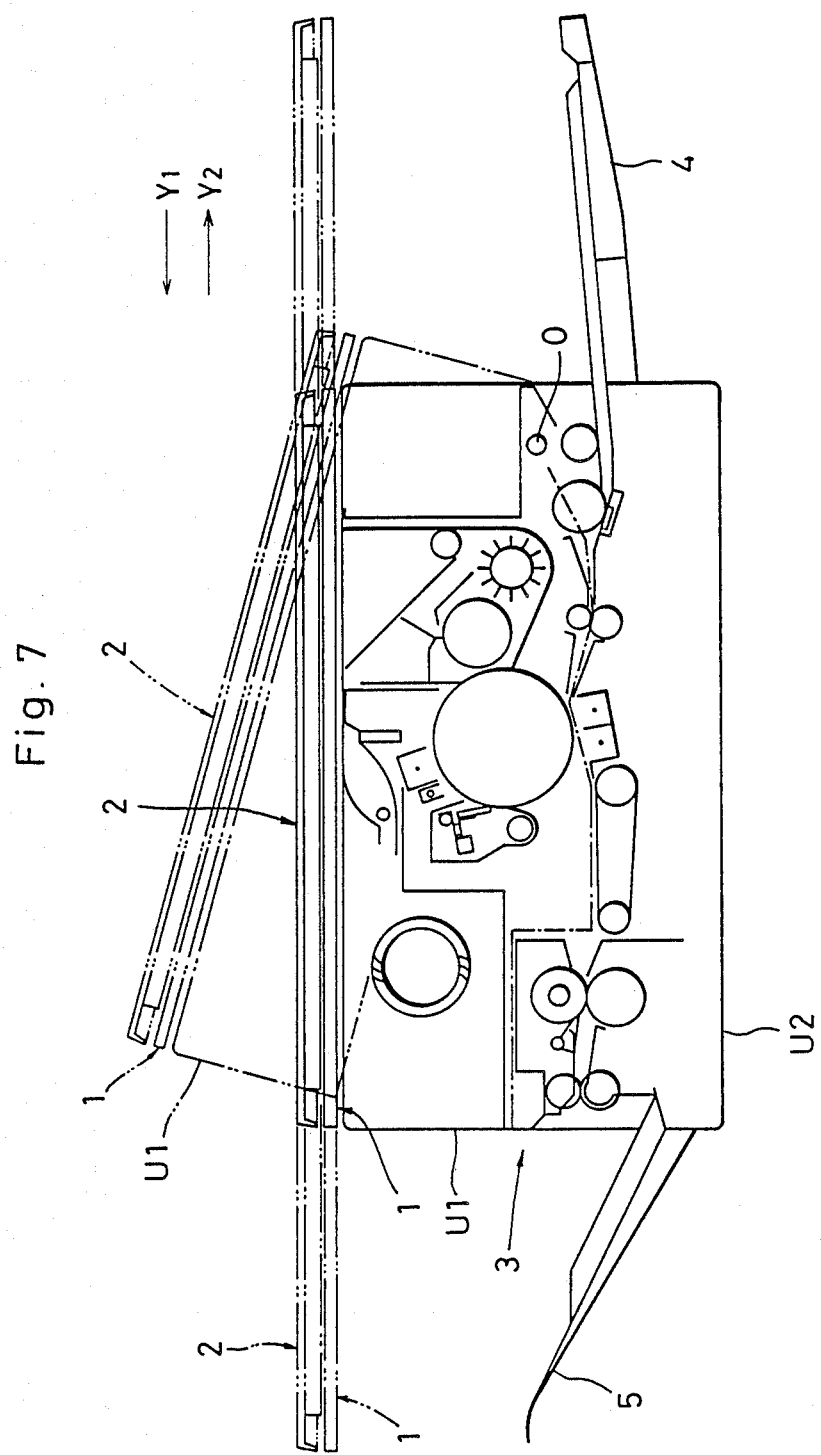
FIG. 7 is a front view of a copying machine with its original-holding cover in closed position.

Referring to FIGS. 4 and 5, a copying machine as an image formation device to which the original-holding cover of the present invention is applied, comprises, a copying machine body 3, a manual paper feed tray 4 which is attached to one side of the body 3, a receiving tray 5 attached to the other side of the body 3, an original platen 1 which is movably mounted on the top of the body 3 in such a manner that it is slidable in the lateral direction (the right and left directions in FIGS. 4 and 5 are designated by arrowmarks Y₁ and Y₂, respectively; the same applies to FIG. 1, FIGS. 2 (a) and 2 (b), FIG. 6 and FIG. 7), an original-holding cover 2 rotatably mounted on the platen 1 at a predetermined position, and an operation panel 6 mounted on the copying machine body 3 at a predetermined position in the top front thereof. As shown in FIGS. 5 and 7, the above copying machine is divided in an upper unit U1 and a lower unit U2. This copying machine is a duplicator of the so-called clamshell type, in which the upper unit U1 is able to open and close with respect to the lower unit U2 on rotation about a pivotal axis 0 of the lower unit U2 which is extending in the forward-rearward direction (the forward and rearward directions are designated by arrowmarks Y₁ and Y₂ in FIGS. 4 and 5, respectively. The same applies to FIGS. 3 and 6).

The aforesaid platen 1 comprises, as shown in FIG. 1, a contact glass 11 on which an original is placed, and a contact glass support 11a for supporting the contact glass 11. By a slide support member 12 disposed on the copying machine body 3 the contact glass support 11a is movably supported in such a manner that it can slide in the lateral direction of the copying machine body 3.

Cutouts 14 are each disposed at a predetermined lower position on end faces 13 respectively located in the right and left ends of the contact glass support 11a In FIG. 1, the reference numeral 15 represents a guide rail by which the front lower surface of the platen 1 is slidably supported and the numeral 16 represents a bearing disposed at the rear of the contact glass support 11a. The bearings 16 each comprise, in FIG. 6, a cylindrical element having a cut-out portion 17.

The whole body of the original-holding cover 2 is made of synthetic resin. The original-holding cover 2 comprises a base part 21, an original-holding part 22, and a thin-walled hinge 23 which connects the base part 21 and original-holding part 22 in a mutually rotatable manner. The hinge 23 is able to maintain the original-holding part 22 in an upright position when the base part 21 is in a horizontal position. Pendant members 24 are respectively formed on the right and left sides of the base part 21, and each provided with an elastic tongue element 25 in a predetermined position. The elastic tongue elements 25 are each formed with a boss 25a adapted to engage the end face 13 with the cutout 14 of the platen 1.

Furthermore, as illustrated in FIG. 6, a pair of rotary shafts 26 are each disposed in a predetermined position of the under-side of the base part 21. As the respective rotary shafts 26 are passed through the bearings 16, the base part 21 is connected to the platen 1 rotatably and removably in the direction P in FIG. 5 along the axis of its rotation with respect to the platen and obliquely upward when the upper unit is open. Thus, as each of bearings 16 is elastically expandable owing to the formation of the cutout position 17, the corresponding rotary shaft 26 can be easily connected to the bearing 16. Each rotary shaft 26 is integrally formed, at one end thereof, with a stopper 7 which is a planar sheet. The stopper 7 engages with one end of the bearing 16 to prevent an obliquely downward movement of the original-holding cover 2 when the upper unit U1 is opened. Furthermore, as the stopper 7 is integrally formed with the rotary shaft 26 as described above, the overall manufacturing cost can be decreased.

Referring to FIGS. 1, 2 and 5, the reference numeral 27 represents a planar part for pressing an original and the numeral 28 represents a projecting handle part.

The procedure for mounting the original-holding cover 2 on the platen 1 is as follows.

First, the base part 21 is set in a substantially vertical position Then, with the base part 21 being slightly rotated, the rotary shafts 26 are passed into the bearings 16 in the direction of P'. This direction P' is opposite to the direction P (See FIG. 6). Thereafter, the base part 21 is swung counterclockwise as viewed from the right-hand side in FIG. 1 to engage the tips of the elastic tongue elements 25 with the cutouts 14 as illustrated in FIG. 3 (a) so that the planar part 27 of the original-holding cover 2 lies along the top face of the platen 1. In this condition, the entire surface of the planar part 27 abuts the top surface of the contact glass 11 as shown by two-dot broken line in FIG. 1.

When a thin original is duplicated, an operator grips the projecting handle part 28 and swings only the original-holding part 22 on the hinge 23 clockwise as viewed from the right-hand side to open the original-holding part 22. In this case, since the base part 21 is prevented from rotation by the engagement of the elastic tongue elements 25 with the cutouts 14, it does not occur that the base part 21 is opened following the opening of the original-holding part 22, but only the original-holding part 22 is opened, thus contributing to an improved operation performance With the original-holding part 22 in an open position, an original document D is set on the top surface of the contact glass 11 and, then, the original-holding part 22 is rotated counterclockwise as viewed from the right-hand side, whereby the entire surface of the document D is pressed against the contact glass 11 by the planar part 27. 4

After the document D has been set as described above, the platen 1 is reciprocated as shown by two-dot broken line in FIG. 7 for full exposure of the document to light source, whereby a faithful reproduction of the document D can be obtained In this case, since the base part 21 of the original-holding cover 2 has been fixed in position against the platen 1 by the engagement of the elastic tongue element 25 with the cutout 14, the position of the original-holding cover 2 against the platen 1 is not shifted by the movement of the platen 1. Therefore, the original document D can be securely retained in a predetermined position on the contact glass 11. As a result, it is no longer necessary to position the rotary shafts 26 and bearings 16 in the axial direction and, hence, the coupling arrangement between the base part 21 and platen 1 is simplified.

When a thick original, such as a book B, is copied, an operator grips the projecting handle part 28, opens the original-holding part 22 only and sets the book B on the contact glass 11 [FIG. 2 (a)].

Then, as a downward pressing force is applied to the end portion of the original-holding part 22, a clockwise rotational force is applied to the base part 21 with the point of abutment between the planar part 27 and book B as a fulcrum as shown in FIG. 2 (a). When this rotational force exceeds the force of engagement between the elastic tongue elements 25 and cutouts 14, the tongue elements 25 undergo elastic deformation in the outward direction as shown in FIG. 3 (b), whereby the base part 21 is allowed to swing in the clockwise direction. Therefore, the height of the original-holding part 22 on the side of hinge 23 can be equalized with the height on the side of projecting handle part 28 so that the entire surface of the thicker part of the book B can be uniformly pressed [FIG. 2 (b)]. As the platen 1 is reciprocated in this condition, the entire surface of the original can be exposed to light source to obtain a desired reproduction.

As the fairly thick book B is pressed by the above original-holding cover 2, the angle of inclination of the base part 21 is so great that the engagement between the end faces 13 of the contact glass support 11a and the elastic tongue elements 25 becomes shallow. If the upper unit U1 is opened when dealing with a jam, for instance, in the above condition, the elastic tongue elements 25 tend to be disengaged from the end faces 13 by the impact of the opening However, in the embodiment described above, the stoppers 7 disposed at the ends of the rotary shafts 26 respectively engage with the one end of the bearings 16, with the result that even if the elastic tongue elements 25 are disengaged from the end faces 13, the rotary shafts 26 are not removed from the bearings 16, thus preventing the original-holding cover 2 from being disengaged from the platen 1.

In the above embodiment, each of the pendant members 24 of the base part 21 is formed as an elastic member provided with a boss at a predetermined position. The boss is engaged with the cutout 14 and thereby controlling the rotation of the base part 21. It is possible to prevent the rotation of the base part 21 by the elastic abutting force against the end faces 13 of the bosses only without providing the cutouts 14.

Furthermore, the stopper may be formed at one end of the bearing 16 so as to come in contact with the end portion of the rotary shaft 26 when the rotary shaft 26 is engaged with the bearing 16. It is also possible to respectively provide the stoppers at both the rotary shaft 26 and bearing 16.

While the present invention has been described in detail by way of preferred embodiments with reference to the accompanying drawings, the present invention is by no means limited to the particular embodiments but should be construed to include many changes and modifications within its scope.

Thus, in accordance with the present invention, the entire surface of an original document can be pressed uniformly, irrespective of the thickness of the document, by a simple construction. Furthermore, despite the removability of the base part from the platen, the stoppers assure a positive prevention of disengagement of the base part from the platen against the impact due to opening of the upper unit for dealing with a jam or other trouble.

What we claim is:

1. An original-holding cover for use in association with an image formation device consisting of an upper unit having an original platen and a lower unit, said upper unit being rotatably mounted on said lower unit about a pivotal axis so as to be opened and closed, which comprises:
   a base part rotatably connected to said original platen of said upper unit,
   an original-holding part disposed in contiguity with said base part and rotatable with respect to the latter,
   at least an elastic engaging means provided at the opposing ends of the base part for engaging with the original platen at a predetermined position, and elastically deformable in a direction of disengagement,
   at least a stopper provided at either or both of the base part and the original platen for preventing an obliquely downward movement of an original-holding cover when the upper unit is open,
   said base part being removable from the original platen in a direction along the axis of rotation thereof with respect to the original platen, and obliquely upward when the upper unit is open.

2. An original-holding cover according to claim 1 wherein said elastic engaging means is elastic tongue element.

3. An original-holding cover according to claim 2 wherein the original platen is provided with cutout portions each engageable with said elastic tongue element.

4. An original-holding cover according to claim 1 wherein said base part is provided with at least a rotary shaft at one end thereof and said original platen is provided with at least a cylindrical bearing through which said rotary shaft passes so as to be engaged therewith.

5. An original-holding cover according to claim 4 wherein said bearing has a cutout portion.

6. An original-holding cover according to claim 4 wherein said rotary shaft is provided with a stopper which is engageable with one end of said bearing.

* * * * *